Dec. 8, 1953 H. RINIA 2,662,174

AMPLITUDE DISCRIMINATING NOISE REDUCING MEANS

Filed July 16, 1946

INVENTOR.
HERRE RINIA
BY Fred M Vogel
AGENT.

Patented Dec. 8, 1953 2,662,174

UNITED STATES PATENT OFFICE 2,662,174

AMPLITUDE DISCRIMINATING NOISE REDUCING MEANS

Herre Rinia, Eindhoven, Netherlands, assignor to Hartford National Bank and Trust Company, Hartford, Conn., as trustee Application July 16, 1946, Serial No. 684,072
In the Netherlands November 25, 1942

Section 1, Public Law 690, August 8, 1946
Patent expires November 25, 1962

2 Claims. (Cl. 250—20)

The invention relates to a device for the reception of signals, more particularly of electric currents of variable intensity, which are transmitted by a carrier wave modulated by successive impulses of variable duration.

Figure 1:
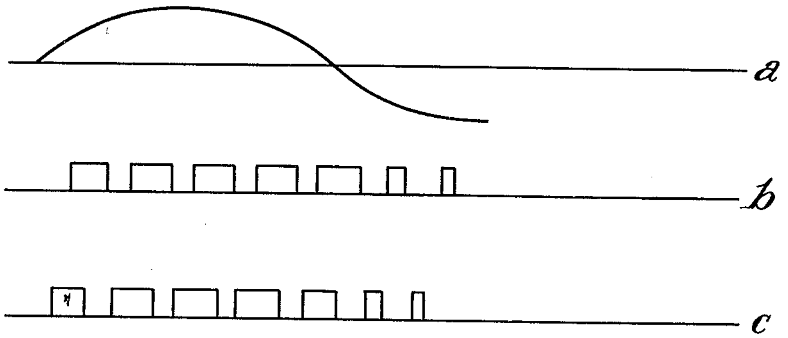

Different systems wherein for the transmission of signals use is made of impulses of variable duration are known. Fig. 1 of the accompanying drawing shows a few of these known impulse types.

In Fig. 1*a* the curve shown therein represents part of a sine-shaped oscillation which is to be transmitted.

Figs. 1*b* and 1*c* represent the impulses which are to be utilized for this purpose. The frequency of the impulses is constant whereas the duration varies dependently upon the instantaneous value of the signal to be transmitted. With the impulses represented in Fig. 1*b* the time-distance between the middles of the impulses is constant whereas with the impulses represented in Fig. 1*c* the time-distance between the fronts of the impulses is constant.

In the reception of oscillations modulated by means of impulses of the kind shown in Fig. 1*b*, it is known already to utilize a limiter in order to improve the ratio between signal and interference with respect to the ratio which is attained in the reception of a carrier wave modulated in amplitude. Since, however, besides this advantage there also arises the drawback that the band-width required for the transmission of the impulses in question considerably exceeds the width required for a carrier wave modulated in amplitude, the above-mentioned systems have not been utilized in practice.

The invention is based on the recognition that with the aid of a limiter it is only the influence of the interferences occurring during the duration of the carrier-wave impulses that is eliminated but that the interferences occurring during the intervals between the carrier-wave impulses are allowed to pass substantially without being weakened.

According to the invention, these interferences, so far as the amplitude is considerably smaller than the amplitude of the received carrier-wave impulses, are also suppressed almost completely by utilizing, in conjunction with a limiter, a device which ensures that only impulses whose amplitude exceeds a determined threshold value contribute to the reproduction. We thus obtain an improvement of the signal-noise ratio, which is proportional to the root of the band-width. With respect to the known amplitude modulation this improvement is such that the disadvantage of the large band-width is pushed thereby into the background.

As compared with the known frequency modulation wherein the transmitted frequency varies with the instantaneous value of the signal to be transmitted, which system also requires a large band-width, the systems under consideration offer the advantage that in the transmission of a carrier wave modulated by impulses a transmitter which is continuously fully loaded during the transmission of oscillations modulated in frequency can be considerably overloaded during the transmission of the impulses. With a transmitter of a determined mean power it is thus possible to transmit in the last-mentioned case carrier-wave impulses of larger amplitude than the maximum amplitude in the case of a continuous load. This larger amplitude of the transmitted impulses affords the following advantage.

In the case of frequency modulation the advantage of a larger freedom from interference, which advantage is attained with respect to amplitude modulation, disappears as soon as the interference occurring in the receiver is approximately as strong as the amplitude of the received oscillations. This is also the case with the systems under consideration; since, however, in the systems under consideration and with a transmitter of the same mean power the amplitude of the carrier-wave impulses is larger, it is only an interference of proportionally greater intensity that can be troublesome, the more so as the duration of the carrier-wave impulses is shorter with respect to the intervals between the impulses since in this case the carrier-wave impulses to be transmitted by a transmitter of a determined mean power may have a larger amplitude.

Figure 2:
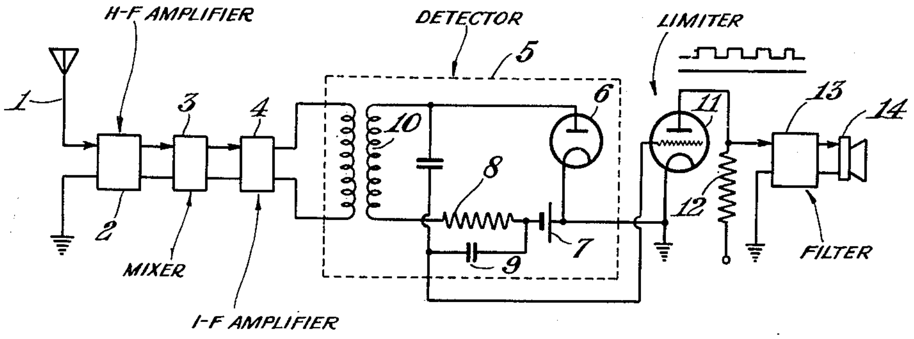

Fig. 2 of the accompanying drawing represents one form of construction of a device according to the invention which is designed for the reception of a carrier-wave modulated by impulses of the type shown in Figs. 1*b* and 1*c*.

In this form of construction the high-frequency carrier-wave impulses received by the aerial 1 are supplied to a high-frequency amplifier 2 which is connected in cascade with a frequency-changer 3, an intermediate-frequency amplifier 4 and a detector 5. A diode-detector 6, which is shown here by way of example, prevents impulses whose amplitude is smaller than the determined threshold value, from contributing to the reproduction. For this purpose the diode 6 has a negative bias voltage which is furnished by a source of voltage 7. The output voltage of the diode appears across an output resistance 8 which is shunted by a condenser 9. A detected voltage appears across the output resistance 8 only if the amplitude of the oscillations to be detected which are supplied to the diode through a circuit 10, exceeds the threshold value furnished by the source of voltage 7. The impulse-shaped voltage which appears across the output resistance 8 of the diode 6 and wherein consequently the interference which occurs between the impulses and whose amplitude is smaller than the threshold value formed by the source of voltage 7 is suppressed, is supplied with negative polarity of the impulses to the grid of a low-frequency amplifying tube 11 which has a limiting effect. So long as the amplitude of the oscillations to be detected is smaller than the threshold value, the grid bias of the tube 11 is determined by the source of voltage 7. This voltage is such that anode current flows through the anode circuit of the tube 11. If the amplitude exceeds the threshold value, the negative bias of the tube 11 increases owing to the voltage drop in the resistance 8 until at a determined value of the output voltage of the diode the tube 11 is blocked and the anode current is suppressed. The consequence thereof is that the amplitude of the current flowing through the output resistance 12 of the limiter 11 is limited to a determined value with the result that interferences which deform the amplitude of the received oscillations are suppressed.

The currents which flow in the output circuit of the tube 11 and whose curve shape is represented in the figure, produce a similar loss of voltage in the output resistance 12 of the tube 11, which voltage is supplied, as the case may be, through further amplification stages, to a filter 13 by which the impulse frequency is sifted out. The output voltage of the filter forms now the desired signal which may be supplied to a load, for example to a loudspeaker 14. The filter is preferably constituted by a transformer through the intermediary of which the final amplifier of the receiver is coupled to the loudspeaker. Alternatively, it is possible to construct the loud-speaker in such manner that it has the effect of a filter.

The arrangement of the filter beyond the final stage of the receiver has the advantage that the final amplifier serves exclusively for the amplification of impulse-shaped voltages so that, if this tube is controlled over a curved portion of the characteristic, a change of the amplitude of the impulse-shaped voltage but substantially no distortion of the received signal which is determined by the duration of the impulses occurs.

In the above-described form of construction the threshold value is constant independently of the amplitude of the received oscillations. In connection with phenomena of fading which may occur it may be desirable, however, to utilize a threshold value which varies with the average intensity of the reception in which event it is also desirable that the amplitude to which the received impulses are limited should depend upon the average intensity of the received carrier-wave impulses. Preferably, however, use is made of an automatic control for keeping constant the average intensity of the impulses which are supplied to the device with threshold value and to the limiter, in which event the two values at which these impulses are cut off may be constant. In the above-described form of construction use is therefore preferably made of an automatic control of the amplification of the amplification stages preceding the detector dependently on the average intensity of the received carrier-wave impulses.

What I claim is:

1. In a receiver for demodulating incoming successive radio-frequency pulses whose duration varies as a function of the instantaneous amplitude of a signal, the combination comprising a detector for translating the incoming pulses into corresponding voltage impulses, said detector including a diode electron tube and means for applying a bias voltage across said tube whereby said detector is responsive solely to applied voltages exceeding a predetermined amplitude, and an amplitude limiter coupled to the output of said detector and arranged to remove extraneous amplitude modulation present in the voltage impulses applied thereto, said limiter including an electron discharge device having a cathode, a grid and an anode, an anode resistor, means to apply a positive potential through said resistor to the anode of said tube and means to apply a bias voltage to the grid of said device whereby said tube has a limit value below the amplitude of the voltage impulses applied thereto.

2. In a receiver for demodulating incoming successive radio-frequency pulses whose duration varies as a function of the instantaneous amplitude of a signal, the combination comprising a detector for translating the incoming pulses into corresponding voltage impulses, said detector including a diode electron tube having a cathode and an anode, a resonant circuit, an output impedance and a source of bias voltage having its positive terminal connected to the cathode of said diode and its negative terminal connected through said impedance in series with said resonant circuit to the anode of said diode, said source having a magnitude establishing a threshold value in said diode which is exceeded only by the incoming pulses whereby corresponding voltage impulses are developed across said impedance, and an amplitude limiter including an electron discharge device having a cathode connected to the cathode of said diode, a grid connected to the junction of said impedance and said resonant circuit and a plate electrode, a plate resistor and means to impress a positive voltage through said resistor on said plate electrode to establish a limit value in said device which is below the amplitude of the voltage impulses applied to the grid of the tube whereby traneous amplitude modulation is removed from the voltage impulses developed across said resistor.

HERRE RINIA.

References Cited in the file of this patent

UNITED STATES PATENTS

| Number | Name | Date |
|---|---|---|
| 2,061,734 | Kell | Nov. 24, 1936 |
| 2,233,339 | Brown, Jr. | Feb. 25, 1941 |
| 2,235,550 | Fyler | Mar. 18, 1941 |
| 2,248,267 | Bacon | July 8, 1941 |
| 2,266,401 | Reeves | Dec. 16, 1941 |
| 2,356,140 | Applegarth, Jr. | Aug. 22, 1944 |
| 2,392,546 | Peterson | Jan. 8, 1946 |
| 2,416,305 | Grieg | Feb. 25, 1947 |
| 2,416,328 | Labin | Feb. 25, 1947 |

FOREIGN PATENTS

| Number | Country | Date |
|---|---|---|
| 191,777 | Great Britain | Jan. 12, 1923 |